US012154252B2

(12) United States Patent
Al Ibrahim et al.

(10) Patent No.: US 12,154,252 B2
(45) Date of Patent: Nov. 26, 2024

(54) METHOD FOR DENOISING WELLBORE IMAGE LOGS UTILIZING NEURAL NETWORKS

(71) Applicant: SAUDI ARABIAN OIL COMPANY, Dhahran (SA)

(72) Inventors: Mustafa Ali H. Al Ibrahim, Safwa (SA); Mokhles M. Mezghani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 349 days.

(21) Appl. No.: 17/489,926

(22) Filed: Sep. 30, 2021

(65) Prior Publication Data

US 2023/0101218 A1   Mar. 30, 2023

(51) Int. Cl.
*G06T 5/70*   (2024.01)
*G06N 3/08*   (2023.01)

(52) U.S. Cl.
CPC .............. *G06T 5/70* (2024.01); *G06N 3/08* (2013.01); *G06T 2207/20021* (2013.01);
(Continued)

(58) Field of Classification Search
CPC ............. G06T 5/70; G06T 2207/20021; G06T 2207/20081; G06T 2207/20084;
(Continued)

(56) References Cited

U.S. PATENT DOCUMENTS 11,200,456 B2 * 12/2021 Pinkovich ................. G06F 7/58
11,639,657 B2 *  5/2023 Madasu ................... E21B 47/07
                                                     166/244.1
(Continued)

FOREIGN PATENT DOCUMENTS

CN    112083482 A    12/2020
WO    2021134111 A1   7/2021

OTHER PUBLICATIONS

"Deep Learning Seismic Random Noise Attenuation via Improved Residual Convolutional Neural Network"; Liuqing Yang, IEEE Transactions on Geoscience and Remote Sensing (vol. 59, Issue: 9, 2021, pp. 7968-7981) (Year: 2021).*

(Continued)

*Primary Examiner* — Michael S Osinski
(74) *Attorney, Agent, or Firm* — Osha Bergman Watanabe & Burton LLP

(57) ABSTRACT

A system and method for determining a noise-attenuated wellbore image is disclosed. The method includes obtaining a plurality of training images of a first wellbore wall portion, where each training image includes a first signal component and a first noise component, and training, using the plurality of training images, an artificial neural network to estimate the first signal component of one of the plurality of training images. The method further includes obtaining an application image of a second wellbore wall portion, including a second signal component and a second noise component, and determining the noise-attenuated wellbore image by applying the trained artificial neural network to the application image, wherein the noise-attenuated wellbore image comprises the second signal component.

20 Claims, 10 Drawing Sheets

(52) U.S. Cl.
CPC ............... *G06T 2207/20081* (2013.01); *G06T 2207/20084* (2013.01); *G06T 2207/30181* (2013.01)

(58) Field of Classification Search
CPC ... G06T 2207/30181; G06T 5/60; G06T 5/50; G06T 2207/30004; G06T 5/73; G06T 7/0012; G06T 2207/10081; G06T 2207/10088; G06T 2207/10116; G06T 2207/20212; G06T 2207/20182; G06T 2207/20221; G06T 7/11; G06N 3/08; G06N 3/0455; G06N 3/048; G06N 3/0464; G06N 3/047; G06N 3/084; G06N 3/045; G06N 3/04; G06N 3/044; G06N 3/082; G06N 3/088; G06N 3/09; G06N 3/094; G06V 10/82; G06V 10/764; G06V 10/30; A61B 6/5258
See application file for complete search history.

(56) References Cited

U.S. PATENT DOCUMENTS

| | | | | |
|---|---|---|---|---|
| 11,899,147 | B2* | 2/2024 | Zhu | G01V 1/282 |
| 2016/0321523 | A1* | 11/2016 | Sen | G06V 10/774 |
| 2018/0031718 | A1 | 2/2018 | Freitas et al. | |
| 2018/0137605 | A1* | 5/2018 | Otsuka | G06T 5/70 |
| 2020/0110185 | A1 | 4/2020 | Xu et al. | |
| 2020/0160118 | A1* | 5/2020 | Kageyama | G06F 18/217 |
| 2020/0301036 | A1 | 9/2020 | Ramfjord et al. | |
| 2020/0357097 | A1* | 11/2020 | Peemen | G06T 5/20 |
| 2020/0364842 | A1* | 11/2020 | Chaton | G06T 7/001 |
| 2021/0027430 | A1* | 1/2021 | Yamamoto | G06T 7/0012 |
| 2021/0049743 | A1* | 2/2021 | Litwiller | G06T 5/60 |
| 2021/0088686 | A1 | 3/2021 | Samson et al. | |
| 2021/0089897 | A1 | 3/2021 | Zhang et al. | |
| 2021/0103063 | A1 | 4/2021 | Padhi et al. | |
| 2021/0272240 | A1* | 9/2021 | Litwiller | A61B 6/5258 |
| 2021/0374928 | A1* | 12/2021 | Hida | G06F 18/2148 |
| 2021/0388710 | A1* | 12/2021 | Madasu | G05B 13/027 |
| 2022/0036512 | A1* | 2/2022 | Kim | G01R 33/56545 |
| 2022/0196861 | A1* | 6/2022 | Pattnaik | G01V 1/364 |
| 2022/0205354 | A1* | 6/2022 | Chaki | E21B 43/00 |
| 2022/0392025 | A1* | 12/2022 | Mironica | G06T 5/73 |
| 2023/0029188 | A1* | 1/2023 | Langoju | G06T 7/0012 |
| 2023/0036713 | A1* | 2/2023 | Pattnaik | G06T 5/60 |
| 2023/0059132 | A1* | 2/2023 | Li | G06N 3/088 |
| 2023/0109902 | A1* | 4/2023 | Di | G06N 3/08 382/275 |
| 2023/0206404 | A1* | 6/2023 | Kobayashi | G06T 5/70 382/100 |
| 2023/0245274 | A1* | 8/2023 | Omi | G06T 5/60 382/128 |
| 2023/0316462 | A1* | 10/2023 | Goshen | G06N 3/094 382/128 |
| 2024/0087214 | A1* | 3/2024 | Martin Brualla | G06T 15/20 |

OTHER PUBLICATIONS

Cruz, Rommel Anatoli Quintanilla, et al., "Improving accuracy of automatic fracture detection in borehole images with deep learning and GPUs", IEEE Computer Society, pp. 345-350, 2017 (6 pages).
Assous, Said, et al., "Shearlets and sparse representation for microresistivity borehole image inpainting", Geophysics, vol. 83, No. 1, pp. D17-D25, Jan.-Feb. 2018 (9 pages).
Assous, Said, et al., "Microresistivity borehole image inpainting", Geophysics, vol. 79, No. 2, pp. D31-D39, Mar.-Apr. 2014 (9 pages).
Badrinarayanan, Vijay, et al., "SegNet: A Deep Convolutional Encoder-Decoder Architecture for Robust Semantic Pixel-Wise Labelling", arXiv: 1505.07293v1, May 27, 2015 (10 pages).
Batson, Joshua, et al., "Noise2Self: Blind Denoising by Self-Supervision", arXiv:1901.11365v2, Jun. 8, 2019 (16 pages).
Blundell, Charles, et al., "Weight Uncertainty in Neural Networks", arXiv:1505,05424v2, May 21, 2015 (10 pages).
Boyat, Ajay Kumar, et al., "A Review Paper: Noise Models in Digital Image Processing", Signal & Image Processing: An International Journal (SIPIJ), vol. 6, No. 2, pp. 63-75, Apr. 2015 (13 pages).
Dias, Luciana Olivia, et al., "Automatic detection of fractures and breakouts patterns in acoustic borehole image logs using fast-region convolutional neural networks", Journal of Petroleum Science and Engineering, pp. 1-11, 2020 (11 pages).
Dumoulin, Vincent, et al., "A guide to convolution arithmetic for deep learning," arXiv:1603,07285v2, Jan. 11, 2018 (31 pages).
Gal, Yarin, et al., "Dropout as a Bayesian Approximation: Representing Model Uncertainty in Deep Learning", arXiv:1506.02142v6, Oct. 4, 2016 (' 1 pages).
Gupta, Kinjal Dhar, et al., "A Deep-Learing Approach for Borehole Image Interpretation", SPWLA 60th Logging Symposium, pp. 1-10, Jun. 15-19, 2019 (10 pages).
Hansen, Birger, et al., "Making Interpretable Images from Image Logs", The American Association of Petroleum Geologists, Memoir 92, pp. 51-66, 2010 (16 pages).
Haralick, Robert M., et al., "Textural Features for Image Classification", IEE Transactions on Systems, Man, and Cybernetics, vol. SMC-3, No. 6, pp. 610-621, Nov. 1973 (12 pages).
He, Kaiming, et al., "Delving Deep into Rectfiers: Surpassing Human-level Performance on ImageNet Classification", arXiv:1502.01852v1, Feb. 6, 2015 (11 pages).
Hurley, Neil, "Borehole Images", in G. Asquith and D. Krygowski, Basic Well Log Analysis: AAPG Methods in Exploration 16, pp. 151-163, 2004 (13 pages).
Hurley, Neil F., et al., "Method to Generate Full-Bore Images Using Borehole Images and Multipoint Statistics", Society of Petroleum Engineers, pp. 204-214, Apr. 2011 (11 pages).
Jain, Viren, et al., "Natural Image Denoising with Convolutional Networks", Research Gate, pp. 1-8, Jan. 2008 (8 pages).
Kingma, Diederik P., et al., "Adam: A Method For Stochastic Optimization", arXiv:1412.6980v9, Jan. 30, 2017 (15 pages).
Krull, Alexander, et al., "Noise2Void—Learning Denoising from Single Noisy Images", Computer Vision Foundation, pp. 2129-2137, 2019 (9 pages).
Lagraba, Janier O., et al., "Borehole Image Tool Design, Value of Information, and Tool Selection", The American Association of Petroleum, Geologists, pp. 15-38, 2010 (24 pages).
Lai, J., et al., "A review on the applications of image logs in structural analysis and sedimentary characterization", Marine and Petroleum Geology, 2018 (76 pages).
Lehtinen, Jaakko, et al., "Noise2Noise: Learning Image Restoration without Clean Data", arXiv:1803,04189v3, Oct. 29, 2018 (12 pages).
Pazke, Adam, et al., "PyTorch: An Imperative Style, High-Performance Deep Learning Library", arXiv:1912.01703v1, Dec. 3, 2019 (12 pages).
Pöppelreiter, Michael, et al., "Borehole Image-Log Technology: Application Across the Exploration and Production Life Cycle", The American Association of Petroleum Geologists, pp. 1-13, 2009 (15 pages).
Ronneberger, Olaf, et al., "U-Net: Convolutional Networks for Biomedical Image Segmentation", arXiv:1505,04597v1, May 18, 2015 (8 pages).
Schottky, Walter, "On spontaneous current fluctuations in various electrical conductors", Journal of Micro/Nanolithography, MEMS and MOEMS, pp. 041001-1-041001-11, Oct.-Dec. 2018 (12 pages).
Shridhar, Kumar, et al., Uncertainty Estimations by Softplus normalization in Bayesian Convolutional Neural Networks with Variational Inference, arXiv:1806.05978v6, May 14, 2019 (12 pages).
Shridhar, Kumar, et al., "A Comprehensive guide to Bayesian Convolutional Neural Network with Variational Inference", arXiv:1901.02731v1, Jan. 8, 2019 (38 pages).
Tian, Chunwei, et al., "Deep learning on image denoising: An overview", Elsevier Ltd., Neural Networks 131, pp. 251-275, 2020 (25 pages).
Tishby, Naftali, et al., "Consistent Inference of Probabilities in Layered Networks: Predictions and Generalization", IEEE, pp. II-403-11-409,. 1989 (7 pages).

(56) References Cited

OTHER PUBLICATIONS

Ulyanov, Dmitry, et al., "Deep Image Prior", arXiv:1711.10925v4, May 17, 2020 (23 pages).
Valentín, Manuel Blanco., et al., "A deep residual convolutioal neural network for automatic lithological facies identification in Brazilian pre-salt oilfield wellbore image logs", Journal of Petroleum Science and Engineering, pp. 474-503, 2019 (30 pages).
Wang, Zhou, et al., "Image Quality Assessment: From Error Visibility to Structural Similarity", IEEE Transactions on Image Processing, vol. 13, No. 4, pp. 600-612, Apr. 2004 (13 pages).
Wong, S.A., et al., "Enhancing Borehole Image Data on a High-Resolution PC", Society of Petroleum Engineers, pp. 37-48, 1989 (12 pages).
Xiao, Xiaoling, et al., "An Improved Unsharp Masking Method for Borehole Image Enhancement", IEEE, pp. 349-352, 2010 (4 pages).
Xie, Junyuan, et al., "Image Denoising and Inpainting with Deep Neural Networks", Curran Associates, Inc., 2012 (9 pages).
Xu, Jun, et al., "Noisy-As-Clean: Learning Unsupervised Denoising from the Corrupted Image", arXiv:1906.06878v3, Jul. 4, 2019 (13 pages).
Zhang, Tuanfeng, et al., "Structure- and Texture-Based Fullbore Image Reconstruction," International Association of Mathematical Geosciences, pp. 195-215, 2017 (21 pages).
Zhang, Zhijuan, et al., "Ultrasonic Signal Noise Reduction Processing in Borehole Imaging Application", IEEE, 2016 (6 pages).
Wang, Zhou, et al., "Mean Squared Error: Love It or Leave It? [A new look at signal fidelity measures]", IEEE Signal Processing Manazine, pp. 98-117, Jan. 2009 (20 pages).
Zhu, Lingzue, et al., "Deep and Confident Prediction for Time Series at Uber", arXiv:1709.01907v1, Sep. 6, 2017 (8 pages).
Wang, Yuqing, et al., "Well-Logging Constrained Seismic Inversion Based on Closed-Loop Convolutional Neural Network", IEEE Transactions on Geoscience and Remote Sensing, pp. 1-11, 2020 (11 pages).

\* cited by examiner

METHOD FOR DENOISING WELLBORE IMAGE LOGS UTILIZING NEURAL NETWORKS

BACKGROUND

Wellbore image logs are frequently acquired in wellbores penetrating hydrocarbon reservoirs by engineers and geoscientists in the oil and gas industry. Wellbore image logs may be recorded using one or more of optical, ultrasonic, and electrical resistivity sensors. Wellbore image logs may be recorded using one or more of wireline, slickline, coiled tubing, and drill pipe conveyance. Wellbore image logs may be recorded using drill pipe conveyance both while drilling ("LWD") and after drilling the wellbore.

Wellbore image logs may be interpreted to provide information about the location and dip of geological layers penetrated by the wellbore and the existence, location, and orientation of natural and hydraulic fractures. Wellbore image logs may also provide information about the condition of the wellbore, including the response of the wellbore to geological stresses and imperfections in the wellbore created during the drilling process.

The quality of wellbore images is frequently inversely related the logging speed with which they are acquired. Thus, slower logging speeds, and consequently greater expense, may be required to obtain higher quality wellbore images.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining a noise-attenuated wellbore image is disclosed. The method includes obtaining a plurality of training images of a first wellbore wall portion, where each training image includes a first signal component and a first noise component, and training, using the plurality of training images, an artificial neural network to estimate the first signal component of one of the plurality of training images. The method further includes obtaining an application image of a second wellbore wall portion, including a second signal component and a second noise component, and determining the noise-attenuated wellbore image by applying the trained artificial neural network to the application image, where the noise-attenuated wellbore image includes the second signal component.

In general, in one aspect, embodiments relate to a non-transitory computer readable medium storing instructions executable by a computer processor. The instructions include functionality for obtaining a plurality of training images of a first wellbore wall portion, where each training image includes a first signal component and a first noise component, and training, using the plurality of training images, an artificial neural network to estimate the first signal component of one of the plurality of training images. The instructions further include functionality for obtaining an application image of a second wellbore wall portion, including a second signal component and a second noise component, and determining the noise-attenuated wellbore image by applying the trained artificial neural network to the application image, where the noise-attenuated wellbore image includes the second signal component.

In general, in one aspect, embodiments relate to a system including a wellbore imaging tool, a conveyance device configured to convey the wellbore imaging tool within a wellbore, and an image processor. The image processor is configured to obtain a plurality of training images of a first wellbore wall portion, where each training image includes a first signal component and a first noise component, and train, using the plurality of training images, an artificial neural network to estimate the first signal component of one of the plurality of training images. The image processor is further configured to obtain an application image of a second wellbore wall portion, including a second signal component and a second noise component, and determine the noise-attenuated wellbore image by applying the trained artificial neural network to the application image, where the noise-attenuated wellbore image includes the second signal component.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology.

Rather, the use of ordinal numbers is to distinguish between the elements. By way of an example, a first element is distinct from a second element, and the first element may encompass more than one element and succeed (or precede) the second element in an ordering of elements.

Systems and methods are disclosed for training a convolutional neural network to distinguish signal from noise in wellbore images and for applying the trained convolutional neural network to produce noise-attenuated wellbore images. Images of wellbore walls are by wellbore imaging tools in portions of hydrocarbon wells. Wellbore images may be recorded, for example, using one or more of optical, ultrasonic, and electrical resistivity sensors and may provide information about the location and orientation of geological layers, natural fractures, and hydraulic fractures intersecting the wellbore. Wellbore image logs may also provide information about the condition of the wellbore, including its response to geological stresses and imperfections created during the drilling process. Wellbore images are frequently noisy due to sensor, environmental or operational deficiencies and noise is often inversely correlated with tool motion ("logging") speed.

Figure 1B:
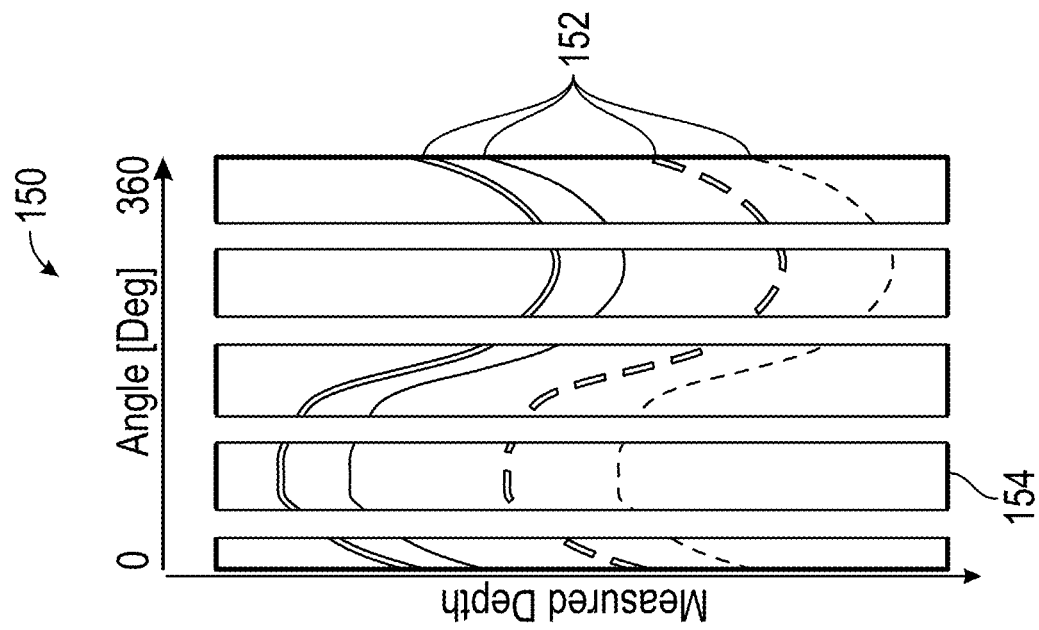
FIGS. 1A and 1B depict systems in accordance with one or more embodiments.
Figure 1A:
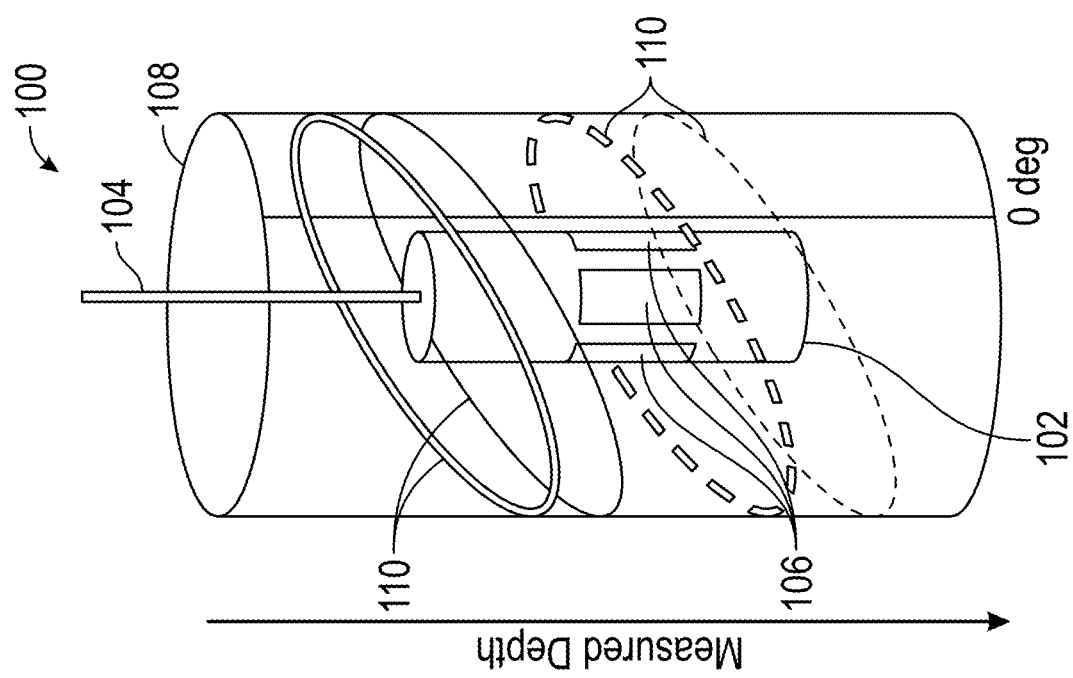

FIG. 1A depicts a wellbore imaging tool (102) suspended in a wellbore (100) in accordance with one or more embodiments. The wellbore imaging tool (102) may be suspended from the surface using a means of conveyance (104) that may be wireline, slickline, coiled tubing, drill pipe, wired drill pipe, or any other mechanism known by those skilled in the art. In some embodiments, the wellbore imaging tool (102) may include a plurality of imaging sensors (106) positioned at azimuthal intervals around the circumference of the wellbore imaging tool (102). The imaging sensors may only cover a fraction of the surface of the wellbore imaging tool (102). Similarly, the imaging sensors may only interrogate a fraction of the circumference of the wellbore (100). In other embodiments, the wellbore imaging tool (102) may include one or more imaging sensors mounted in a rotating sensor assembly (not shown). In these embodiments, the imaging sensor may interrogate the entire circumference of the wellbore (100).

The wellbore imaging tool (102) may be moved into and out of the wellbore (100) to record an image of a portion of the wellbore (100) extending over an axially distance. This axial movement of the wellbore imaging tool while forming an image is routinely called "logging" by those skilled in the art. The distance measured axially along the wellbore (100) may be termed "measured depth". While measured depth and true vertical depth may be synonymous for a vertical wellbore, in general for a deviated or horizontal wellbore (100) measured depth and true vertical depth will be different. Typically, the wellbore imaging tool (102) may record axially continuous images over hundreds or thousands of feet of measured depth, with pixels that are a fraction of an inch in each dimension.

A wellbore imaging tool (102) may image the intersection of geological features, such as bedding planes, faults, and fractures, with the wellbore wall (108). Knowledge of these features may be important for the characterization of a hydrocarbon reservoir and the completion of the wellbore (100). A wellbore imaging tool (102) may also image drilling induced features such as breakouts, cave-ins, wear paths, notches, and other deviations from a smooth cylindrical hole that may be important for designing the completion of the wellbore (100) and the drilling of subsequent wellbores.

Substantially planar features (110), such as geological bedding planes and fractures may intersect the wellbore (100) at an oblique angle. When an image of a planar feature intersecting a wellbore (100) at an oblique angle is displayed on a two-dimensional planar image (150), as shown in FIG. 2B, the resulting feature appears as a sinusoidal curve (152) over the angular portions (154) interrogated by the wellbore imaging tool (102). Interpreting wellbore images (150) may require locating and identifying these sinusoids.

Wellbore imaging tools (102) may use one or more physical measurements to form an image. For example, wellbore imaging tools (102) may use ultrasonic sensors, neutron density sensors, optical sensors, electromagnetic sensors, or resistivity sensors to record wellbore images (150). In some embodiments, a wellbore imaging tool (102) may use only one physical measurement to form an image (150) of the wellbore wall. In other embodiments, a wellbore imaging tool (102) may combine a number of physical measurements to form an image (150) of the wellbore wall (108).

Figure 2:
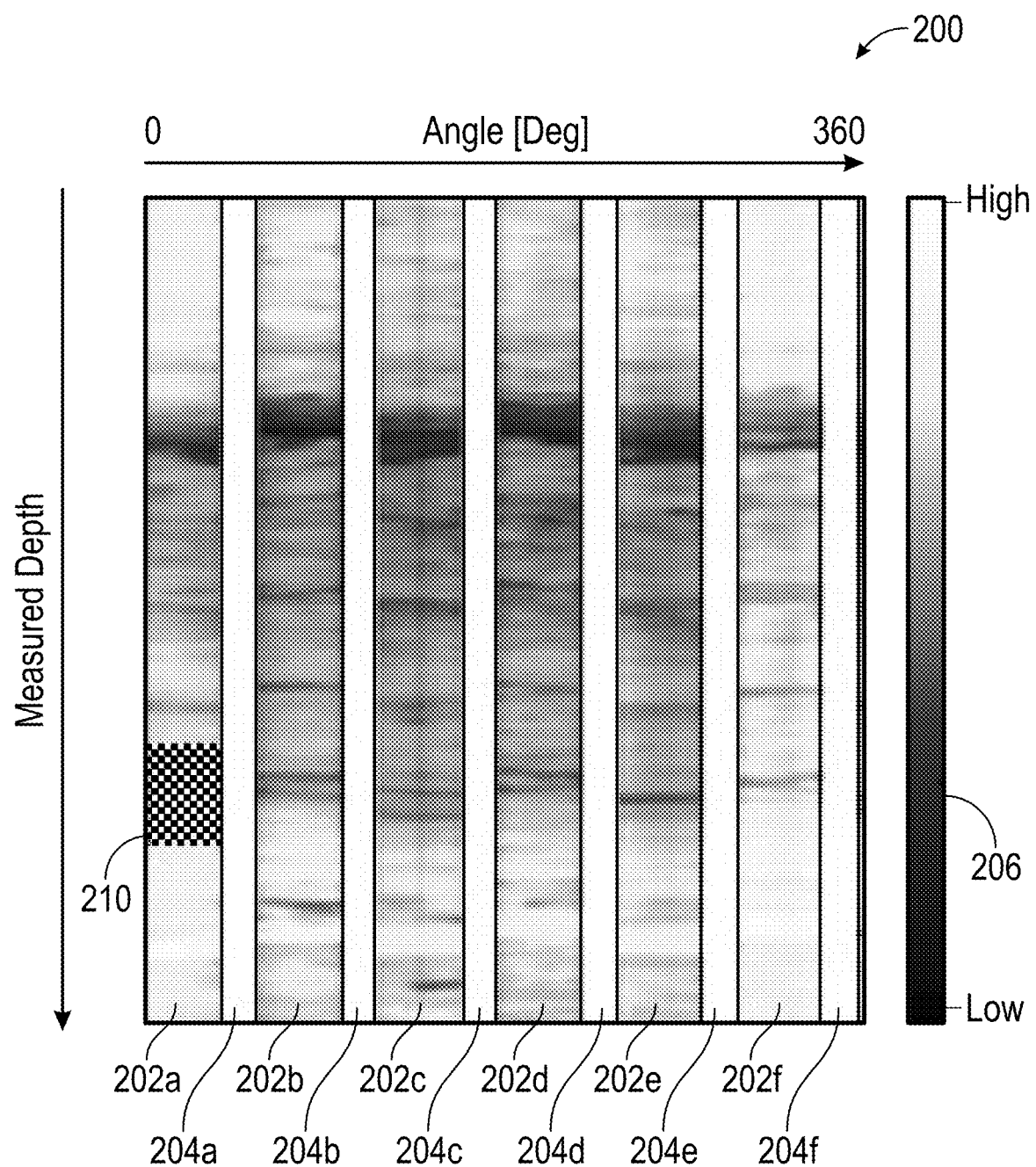
FIG. 2 depicts a wellbore image log in accordance with one or more embodiments.

FIG. 2 shows a wellbore image (200) for a portion of a wellbore (100) in accordance with one or more embodiments. The image (200) includes sub-images from six sensors (202a-f) displayed on a grayscale (206). Unimaged portions (204a-f) of the circumference of the wellbore (100) are present between the sub-images (202a-f). In accordance with some embodiments, the image of the wellbore wall (108) lying in the unimaged portions (204a-f) may be estimated, or interpolated, based on the sub-images (202a-f) using techniques known to one of ordinary skill in the art before the image of the wellbore wall (200) is interpreted. In other embodiments, the image of the wellbore wall (200) may be interpreted based on the sub-images (202a-f), without interpolating unimaged portions (204a-f).

In accordance with one or more embodiments, an image (200) of a wellbore wall (108) may contain signal and may contain noise. The noise may be sensor noise, such as fluctuations in the sensitivity of one or more sensors (106). The noise may be environmental, such as variations in the attenuation of the signal due to fluctuations in the properties of the fluid filling the wellbore (100) or the distance between the imaging sensors (106) and the wellbore wall (108). The noise may be systematic, pseudo-random, or random. Noise may increase the time required to interpret a wellbore image (200) and decrease the reliability of the resulting interpretation. For example, high levels of noise may increase the likelihood that features (152) on the wellbore wall (108) are not detected or are mis-identified.

Noise may often be greater when the wellbore imaging tool (102) is logging at greater axial speed than when logging a lower speed. However, logging at a lower speed increases the time and cost required to record an image over a portion of the wellbore (100). In some embodiments, one or more corrupted portions (210) of an image of a wellbore wall (200) may be so corrupted that it must be removed from the image of the wellbore wall (200) and removed from subsequent processing steps. In some embodiments, a corrupted portion of the wellbore image (200) may be determined based on the average value of the pixels within the corrupted portion (210) in comparison with the average value of pixels surrounding the corrupted portion (210). In other embodiments, the corrupted portion of the wellbore image (200) may be determined based upon the standard deviation of pixels within the corrupted portion (210) in comparison with the standard deviation of pixels surrounding the corrupted portion (210). In still further embodiments, the corrupted portion of the wellbore image (200) may be determined based upon other statistical characteristics of the corrupted portion (210) in comparison with the same statistical characteristics of pixels surrounding the corrupted portion (210).

In accordance with one or more embodiments, artificial neural networks ("ANN") may be used to detect and attenuate noise in images (200) of the wellbore wall (108). Furthermore, the ANN may include an input layer and output layer and a plurality of hidden layers in communication with the input layer, or the output layer, or both the input and the output layer, and with each other. The layers may be a convolutional layer, a pooling layer, a rectified linear unit (ReLU) layer, a softmax layer, a regressor layer, a dropout layer, and/or various other hidden layer types. These hidden layers can be arranged in any order as long as they satisfy the input/output size criteria. Each layer may comprise a set number of image filters. The output of filters from each layer is stacked together in the third dimension. This filter response stack then serves as the input to the next layer(s).

In some embodiments, each hidden layer is a combination of a convolutional layer, a pooling layer, and a ReLU layer in a multilayer architecture. For example, each hidden layer may have a convolutional layer, a pooling layer, and a ReLU layer. Furthermore, in a convolutional layer, the input data set is convolved with a set of learned filters, designed to highlight specific characteristics of the input data set. A pooling layer produces a scaled down version of the output. This is achieved by considering small neighborhood regions and applying the desired operation filter (e.g. min, max, mean, etc.) across the neighborhood. A ReLU layer enhances the nonlinear property of the network by introducing a non-saturating activation function. One example of such a function is to threshold out negative responses (set negative values to zero). A fully connected layer provides a high-level reasoning by connecting each node in the layer to all activation nodes in the previous layer. A softmax layer maps the inputs from the previous layer into a value between 0 and 1 which allows for interpreting the outputs as probabilities and selection of classified facie with highest probability. A dropout layer offers a regularization technique for reducing network over-fitting on the training data by dropping out individual nodes with a certain probability. A loss layer (utilized in training) defines the weight dependent cost function that needs to be optimized (bring cost down to zero) for improved accuracy.

Figure 3A:
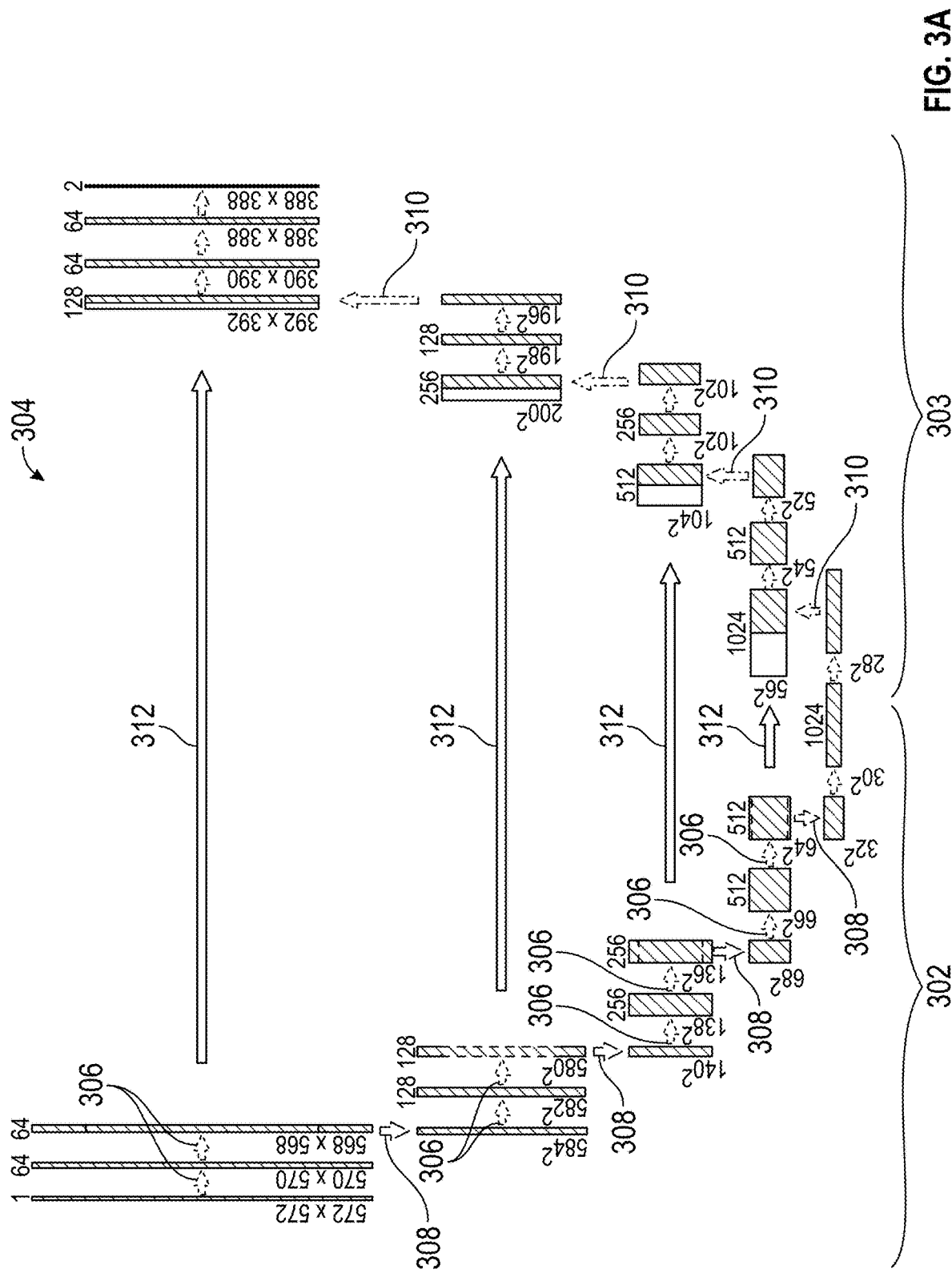
FIG. 3A depicts a convolutional neural network in accordance with one or more embodiments.

In particular, the ANN may be a convolutional neural network ("CNN"). An exemplary CNN architecture, that is a U-net CNN architecture (304) is shown in FIG. 3A. It consists of a contracting path (302) and an expansive path (303). The contracting path (302) follows the typical architecture of a convolutional network. It consists of the repeated application of two 3×3 convolutions that may be unpadded convolutions (306), each followed by a rectified linear unit (ReLU) operation and a 2×2 max pooling operation with stride 2 as a down-sampling operator (308). At each down-sampling step the number of feature channels are doubled.

Every step in the expansive path (303) consists of an up-sampling of the feature map followed by a 2×2 convolution ("up-convolution") (310) that halves the number of feature channels, a concatenation with a copy (312) of the correspondingly cropped feature map from the contracting path, and two 3×3 convolutions, each followed by a ReLU operation. The cropping is necessary due to the loss of border pixels in every convolution. At the final layer a 1×1 convolution (314) is used to map each 64-component feature vector to the desired number of classes.

In some embodiments, the U-net CNN may have 23 convolutional layers in total, in other embodiments there may be more or fewer than 23 layers. To allow a seamless tiling of the output segmentation map, it may be necessary to select the input tile size such that all 2×2 max-pooling operations are applied to a layer with an even number of pixels in each direction.

One of ordinary skill in the art will appreciate that while a U-net CNN architecture is disclosed, other CNN architectures may be used without departing from the copae of the invention. For example, a SegNet architecture as described in "*SegNet: A Deep Convolutional Encoder-Decoder Architecture for Robust Semantic Pixel-Wise Labelling*", Badrinarayanan, Handa, and Cipolla, 2015, may be used in one or more embodiments.

Figure 3B:
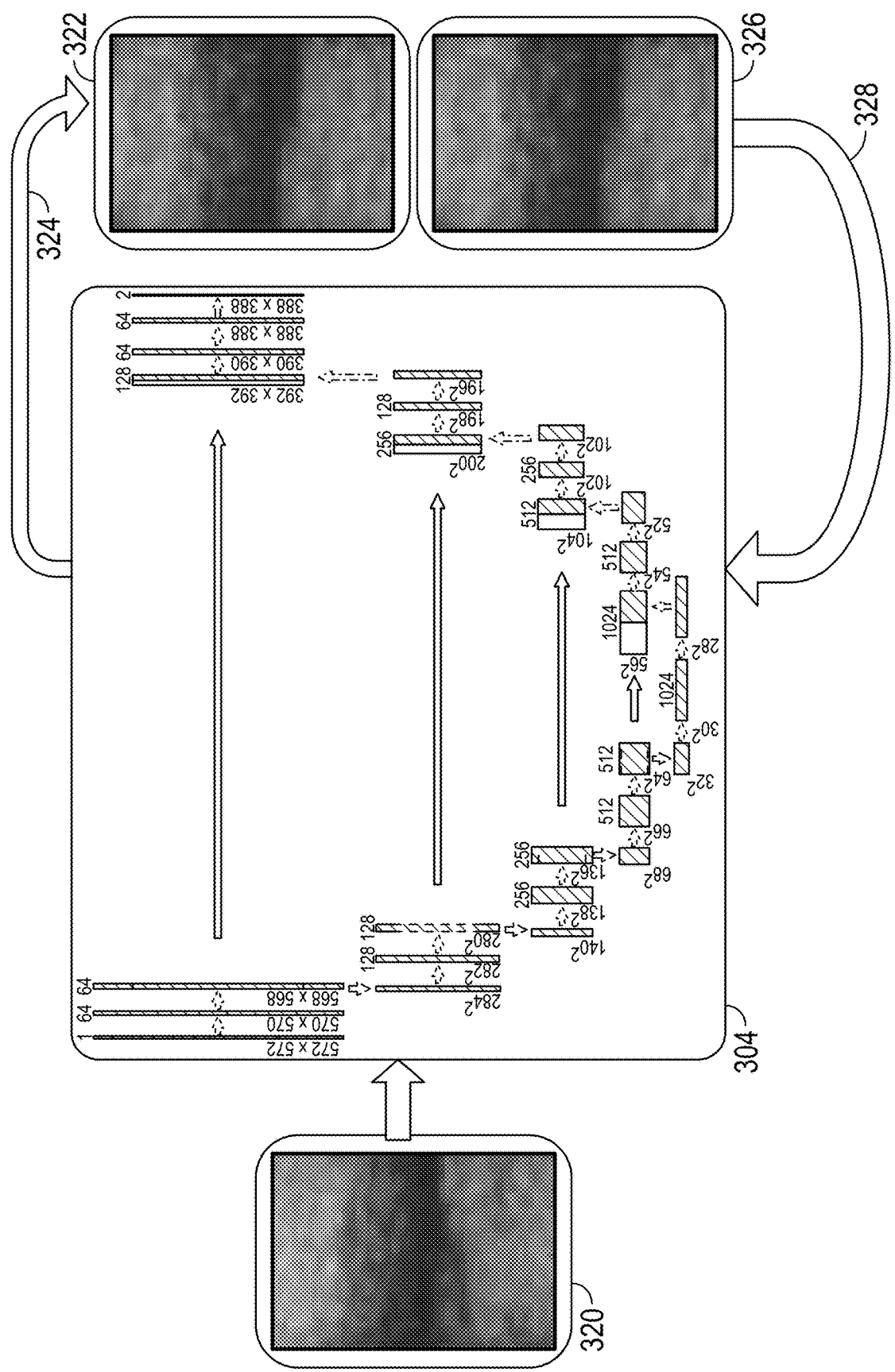
FIG. 3B depicts the training of a convolutional neural network in accordance with one or more embodiments.

FIG. 3B depicts the training of a CNN (304) in accordance with one or more embodiments. A portion of a first training image (320) may be provided as an input to the CNN (304). The CNN may output a predicted image (322), through a prediction channel (324), based upon the first training image (310). The predicted image (312) may be compared with a second training image (326) and an update to the CNN (304) may be feedback through a feedback channel (328) to update the values of the parameter values of the CNN (304). This process of prediction, comparison, and feedback may be repeated until convergence, defined as the cessation of significant change of the CNN parameter values, or of cessation of significant change in the predicted image, is achieved.

In some embodiments, the second training image that is compared to the predicted image may have a lower level of noise than the first training image. However, in other embodiments, the second training image may have a comparable level of noise than the first training image. Embodiments where the two training images have comparable levels of noise may be termed "noise-2-noise" embodiments reflecting the fact that both training images have comparable levels of noise. In these noise-2-noise embodiments the CNN may be trained to find the common component of the first and second training images, i.e., the signal, and reject the difference between the common signal component and each training image, i.e., the noise. A more extensive discussion of noise-2-noise embodiments may be found, for example, in "*Noise2Noise: Learning Image Restoration Without Clean Data*", Lehtinen, Munkbger, Hasselgren, Laine, Karras, Aittala and Aila, Proceedings of the 35 the International Conference on Machine Learning, Stockholm, Sweden, PMLR 80, 2018.

In accordance with one or more embodiments, the update to the CNN maybe determined based upon minimizing a loss function, L. In some embodiments, the loss function may be a least-squares error loss function, $L_2$:

$$L_2 = \Sigma_{i=1}^{n} (\hat{y}_i - f_\theta(\hat{x}_i))^2 \qquad \text{Equation (1)}$$

where $\hat{x}_i$ and $\hat{y}_i$ are the i-th sample of a noisy first and second training image, respectively, $f_\theta$ is a parametric mapping function representing the action of the CNN (304), $\theta$ are the network parameters and n is the total number of samples taken as input by the CNN (304). In other embodiments, the loss function may be an absolute error loss function, $L_1$:

$$L_1 = \Sigma_{i=1}^{n} |\hat{y}_i - f_\theta(\hat{x}_i)|. \qquad \text{Equation (2)}$$

A person of ordinary skill in the art will readily appreciate that other loss functions, such as a cross-entropy loss function, an exponential loss function, a Hellinger distance function, or a Kullback-Leibler divergence function may also be using in one or more embodiments as alternatives to the $L_1$ or $L_2$ loss functions without departing from the scope of the invention.

In accordance with one or more embodiments, the loss function may be minimized using a stochastic gradient-based optimization method. The method may compute individual adaptive learning rates for different parameters, θ, of the CNN (304) from estimates of first and second moments of the gradients of the CNN (304), $$\frac{\partial f_\theta}{\partial \theta},$$

where the first moment is the mean of the gradients and the second moment is the uncentered variance.

In accordance with one or more embodiments, a Bayesian neural network may be used to estimate the uncertainty of a neural network prediction. This procedure is usually referred to as posterior inference in traditional Bayesian models. The Monte Carlo dropout ("MC dropout") framework may be used. MC dropout requires no change of the CNN architecture and provides uncertainty estimation at very little additional computational cost.

Stochastic dropouts may be viewed as the random selection of one or more network parameters to be set to zero while iteratively generating a plurality of realizations of the predicted image. Note that the architecture of the CNN, e.g., the number of layers or number of neurons, are not changed by this procedure. To estimate the predictive mean and predictive uncertainty of the realizations of the predicted image the results of stochastic forward passes through the model. Furthermore, in accordance with one or more embodiments, the MC dropout procedure may be performed concurrently with training the CNN (304), resulting in negligible increase in computational cost.

Figure 4:
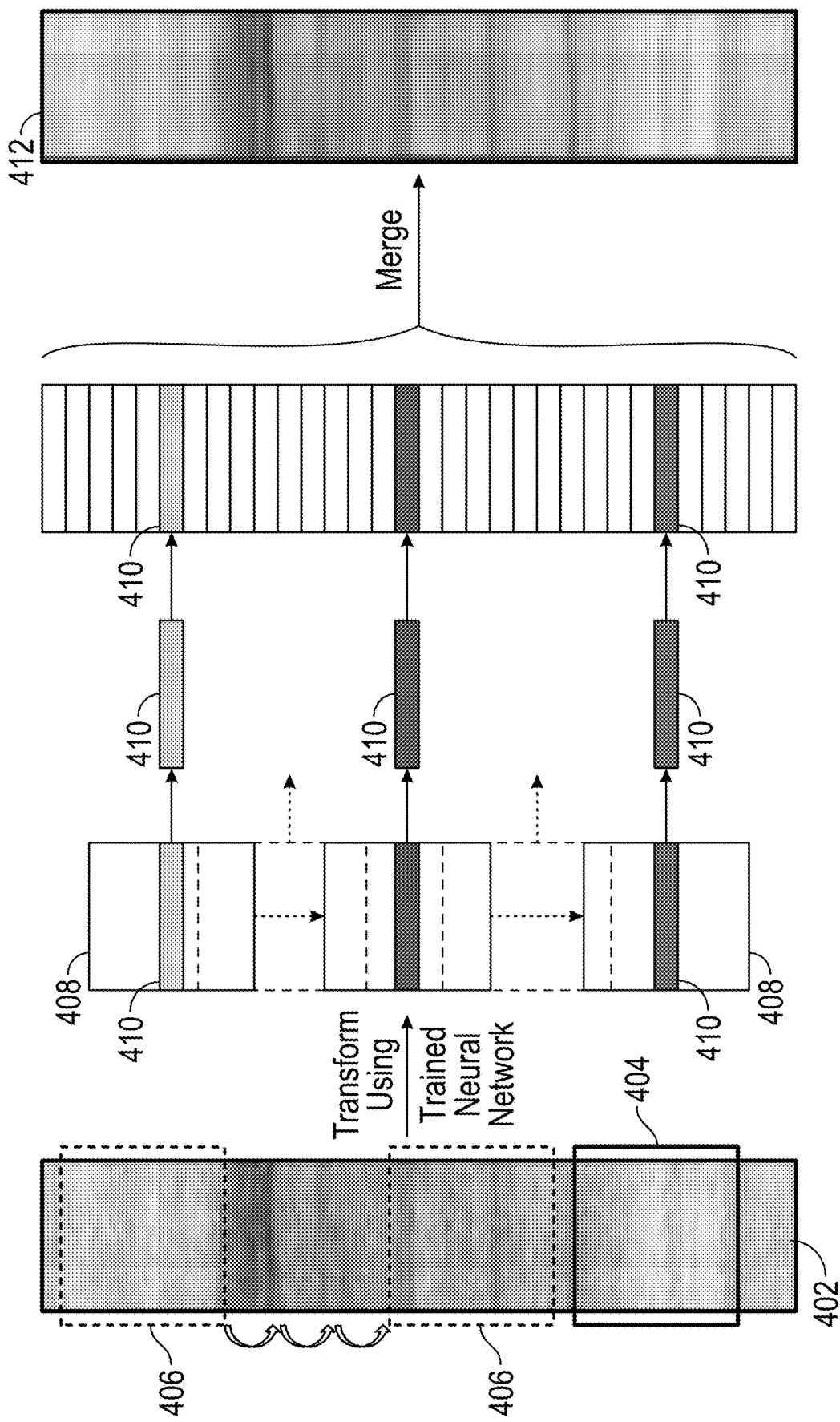
FIG. 4 shows systems in accordance with one or more embodiments.

FIG. 4 illustrates the application of the trained CNN (304) in accordance with one or more embodiments. The application wellbore image (402) may be of varying lengths. In some cases, the application wellbore image (402) may only be a few feet long and in other cases the application wellbore image (402) may be thousands of feet long. In some embodiments, the application wellbore image (402) may come from the same wellbore as the first and second training images; in other embodiments the application wellbore image (402) may be of a different wellbore. In accordance with one or more embodiments, the application wellbore image (402) may be divided into a plurality of sub-images (404) using a sliding window (406) and the trained CNN (304) may be applied to each sub-image (404) independently. The CNN (304) may output noise-attenuated wellbore sub-images (408).

In accordance with one or more embodiments, each artificial neuron of a CNN may take a plurality of pixels from the input image and output a single pixel value where the plurality of input pixels may be arranged as a patch surrounding the location of the output pixel. For output pixels near the edge of an image the patch of input signals may be curtailed or cut-off by the edge of the input image. In effect, the CNN may be seeking to use input pixels that are absent from the input image because the locations of the absent pixels lie outside the input image. Consequently, in accordance with one or more embodiments, the central portion (410) of the output noise-attenuated wellbore sub-image (408) may be of higher quality, i.e., exhibit more effective noise attenuation, than the edges.

The central portion (410) of each sub-image (408) may be combined to form a noise-attenuated wellbore image (412). In some embodiments, the central portions (410) may be combined in a disjoint, i.e., touching but not overlapping, fashion to form the noise-attenuated wellbore image (412). In other embodiments, the central portions (410) may be combined in an overlapping weighted fashion, such that portions of the noise-attenuated wellbore image (412) may result from the weighted sum of a plurality of sub-images (408).

Figure 5:
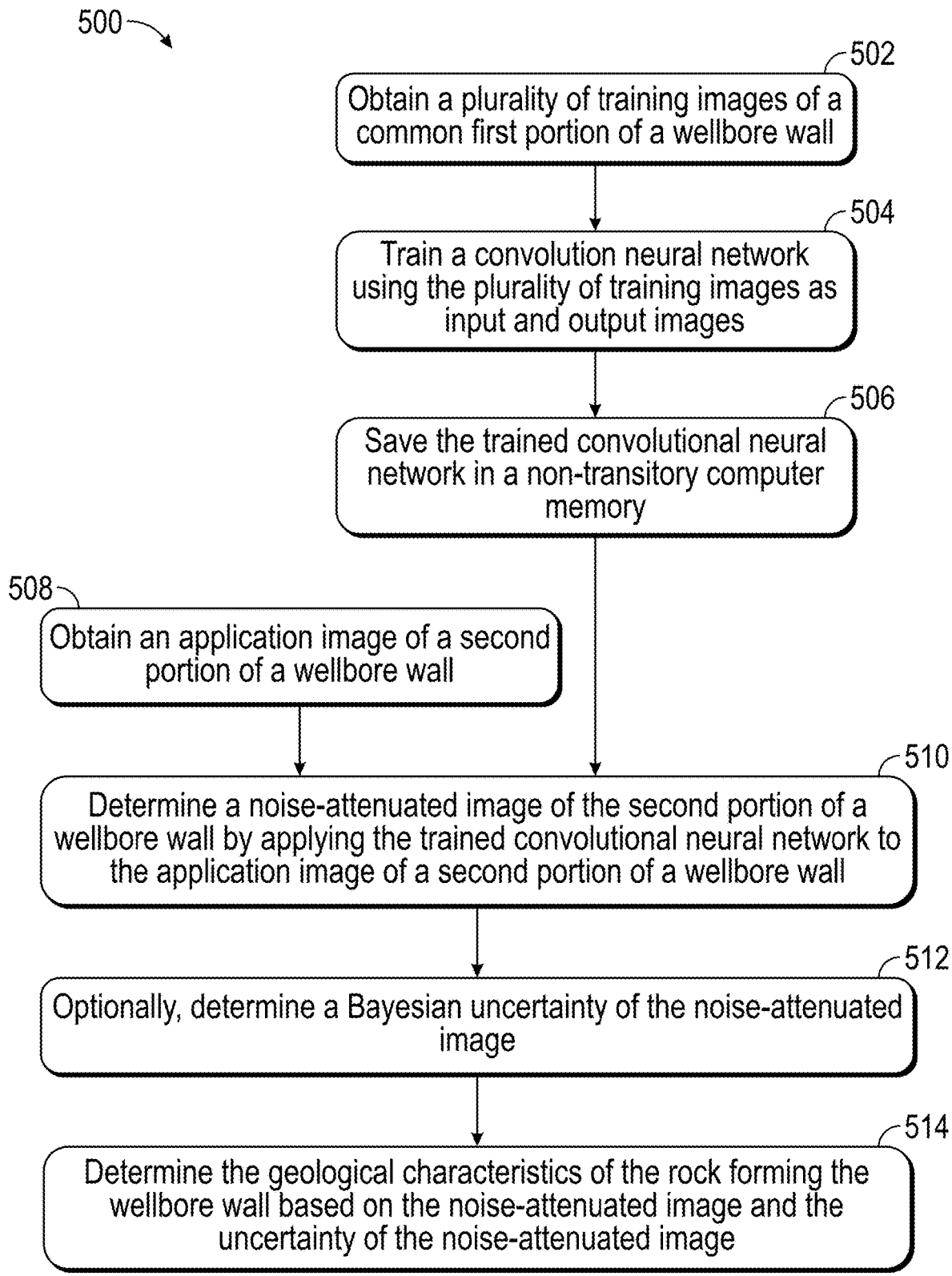
FIG. 5 shows a flowchart in accordance with one or more embodiments.

FIG. 5 shows a flowchart (500) in accordance with one or more embodiments. In Step 502 a plurality of training images of a common first portion of a wellbore wall may be obtained. Two alternative embodiments describing how the plurality of training images may be obtained are discussed in connection with FIGS. 6A and 6B later.

In Step 504 a convolution neural network may be trained using the plurality of training images (404) as input and output noise-attenuated images (412). The CNN may be trained to determine a signal component and a noise component of a training image (404) and to output the signal component as the noise attenuated image (412).

In Step 506, in accordance with one or more embodiments the trained convolution neural network, including the architecture and parameter values of the CNN, may be stored in non-transitory computer memory from where it may subsequently be retrieved for processing an application image of a second portion of a wellbore wall.

In Step 508 an application image of a second portion of a wellbore wall may be obtained. In accordance with some embodiments, the second portion of the wellbore wall (108) may be a different portion of the same wellbore (100) from which the training images (402) were obtained. In accordance with other embodiments, the second portion of the wellbore wall (108) may a portion of a different wellbore that may be a neighboring, or offset, wellbore.

In Step 510, in accordance with one or more embodiments, a noise-attenuated image of the second portion of a wellbore wall may be determined by applying the trained CNN to the application image of a second portion of the wellbore wall. The use of the trained CNN may include dividing the application image into a plurality of sub-images, the application of the trained CNN to each of the plurality of sub-images to determine a plurality of noise-attenuated sub-images, and the combination of the noise attenuated sub-images to determine the noise attenuated image of the second portion of the wellbore wall.

In accordance with one or more embodiments, in Step 512 a Bayesian estimate of the uncertainty of the noise-attenuated image may be determined. This determination may be based on multiple realization of the noise-attenuated image generated using MC dropouts.

In Step 514 the geological characteristics of the rock forming the wellbore wall (108) may be determined based on the noise-attenuated image (412) and the uncertainty of the noise-attenuated image. The characteristic may include the depth and angle at which planar features (110), such as geological beds and fractures intersect the wellbore wall.

Figure 6A:
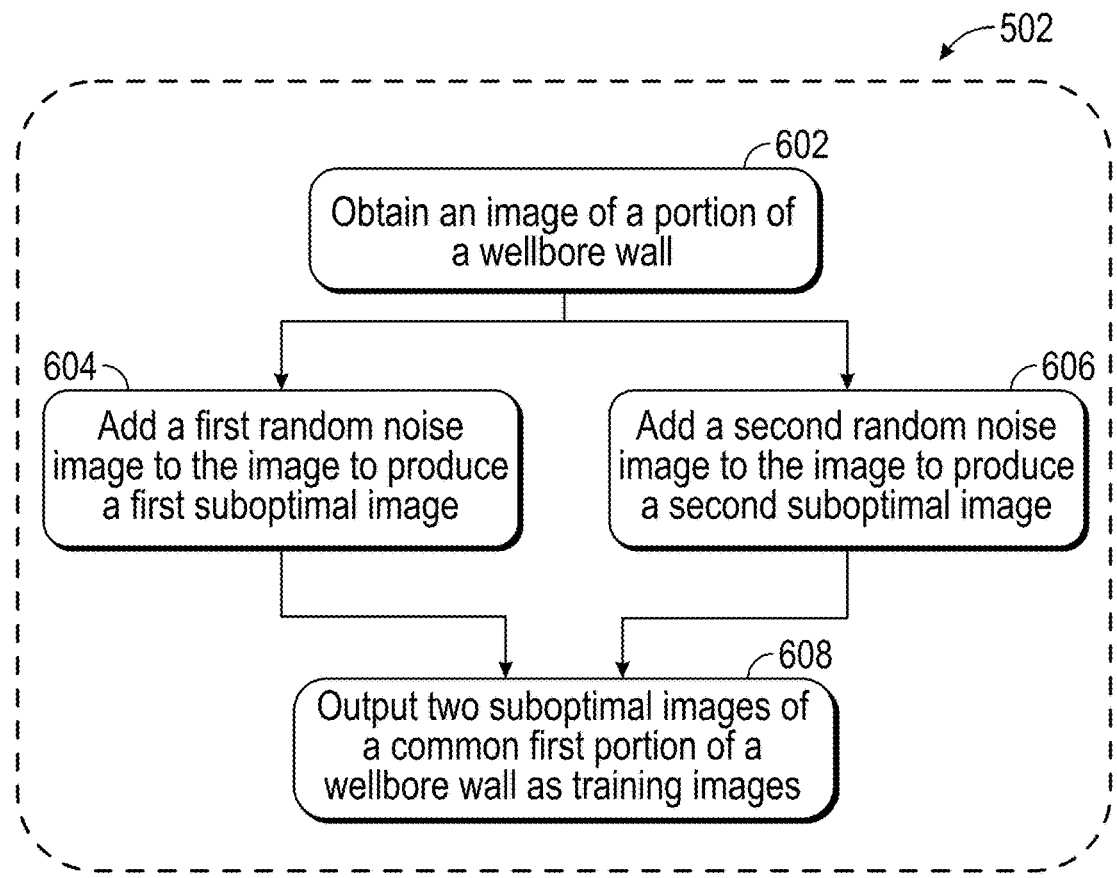
FIGS. 6A and 6B show flowcharts in accordance with one or more embodiments.

FIG. 6A depicts details of obtaining a plurality of training images in Step 502, in accordance with one or more embodiments. In Step 602 an image of a first portion of a wellbore wall (108) may be obtained from a wellbore imaging tool (102). In Step 604 a first random noise image is generated numerically and combined with the image of the first portion of the wellbore wall to generate a first suboptimal, or noisy image. The random noise image may be generated according to many models familiar to a person of ordinary skill in the art without departing from the scope of the invention. For example, the amplitude of the noise may have a Gaussian distribution, a Poisson distribution, or an exponential distribution. Alternatively, the noise may be white noise, Brownian or fractal noise, or impulse (salt and pepper) noise. In addition, the random noise images may have varying and possibly anisotropic spatial correlation lengths and correlation functions.

In Step 606 a second random noise image is generated numerically and combined with the image of the first portion of the wellbore wall to generate a second suboptimal, or noisy image. In some embodiments, the second random noise image may be a second realization of a random noise image with the same statistical characteristics as the first random noise image. In other embodiments, the statistical characteristics of the first noise image and the second noise image may be different.

Further random noise images may be generated and added to the image of the first portion of the wellbore wall to generated additional suboptimal images if required (not shown).

In Step 608, in accordance with one or more embodiments, the suboptimal images may be output and stored in non-transitory computer memory as training images.

Figure 6B:
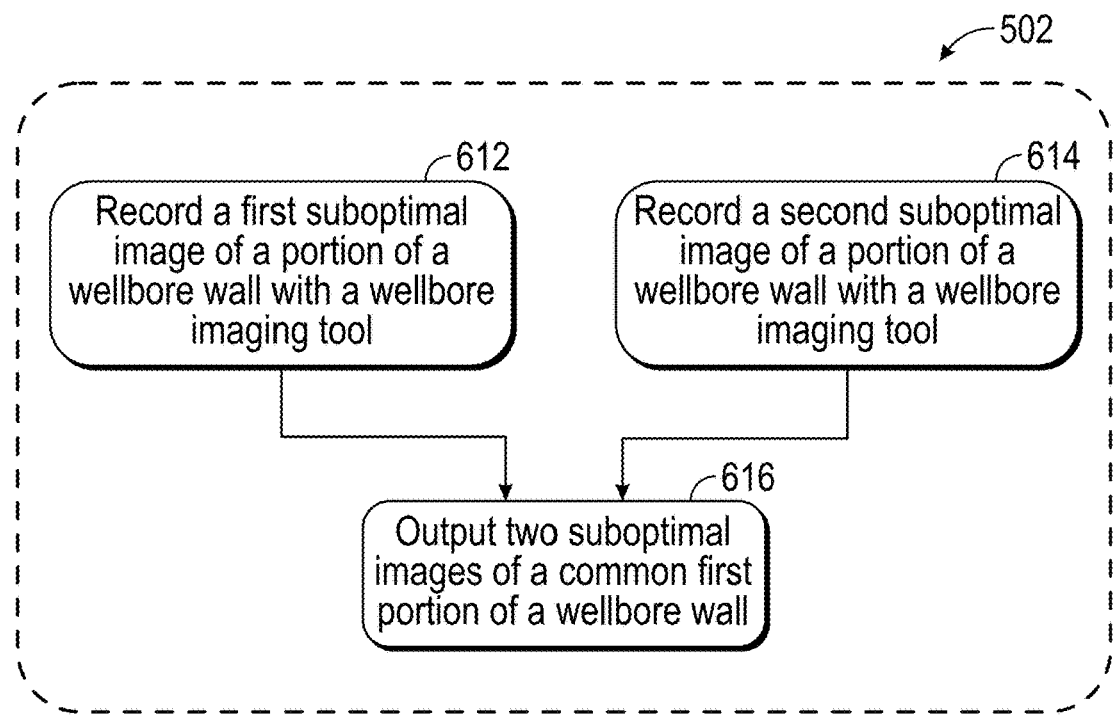

FIG. 6B depicts details of obtaining a plurality of training images in Step 502, in accordance with one or more embodiments. In Step 612 a first suboptimal image of a portion of a wellbore wall (108) with a wellbore imaging tool (102) may be acquired. Since wellbore images typically degrade as the speed of motion of the wellbore logging tool (102) along the axis of the wellbore (100) increases, a suboptimal image of a portion of the wellbore wall (108) may quickly be acquired by moving the wellbore imaging tool (102) rapidly along the wellbore axis.

In Step 614 a second suboptimal image of a portion of a wellbore wall (108) with a wellbore imaging tool (102) may be acquired by repeatedly moving the wellbore imaging tool (102) over the same portion of the wellbore wall (108). The wellbore imaging tool (102) may be moved over the same portion of the wellbore imaging tool at the same speed or at differing speeds without departing form the scope of the invention.

Figure 7:
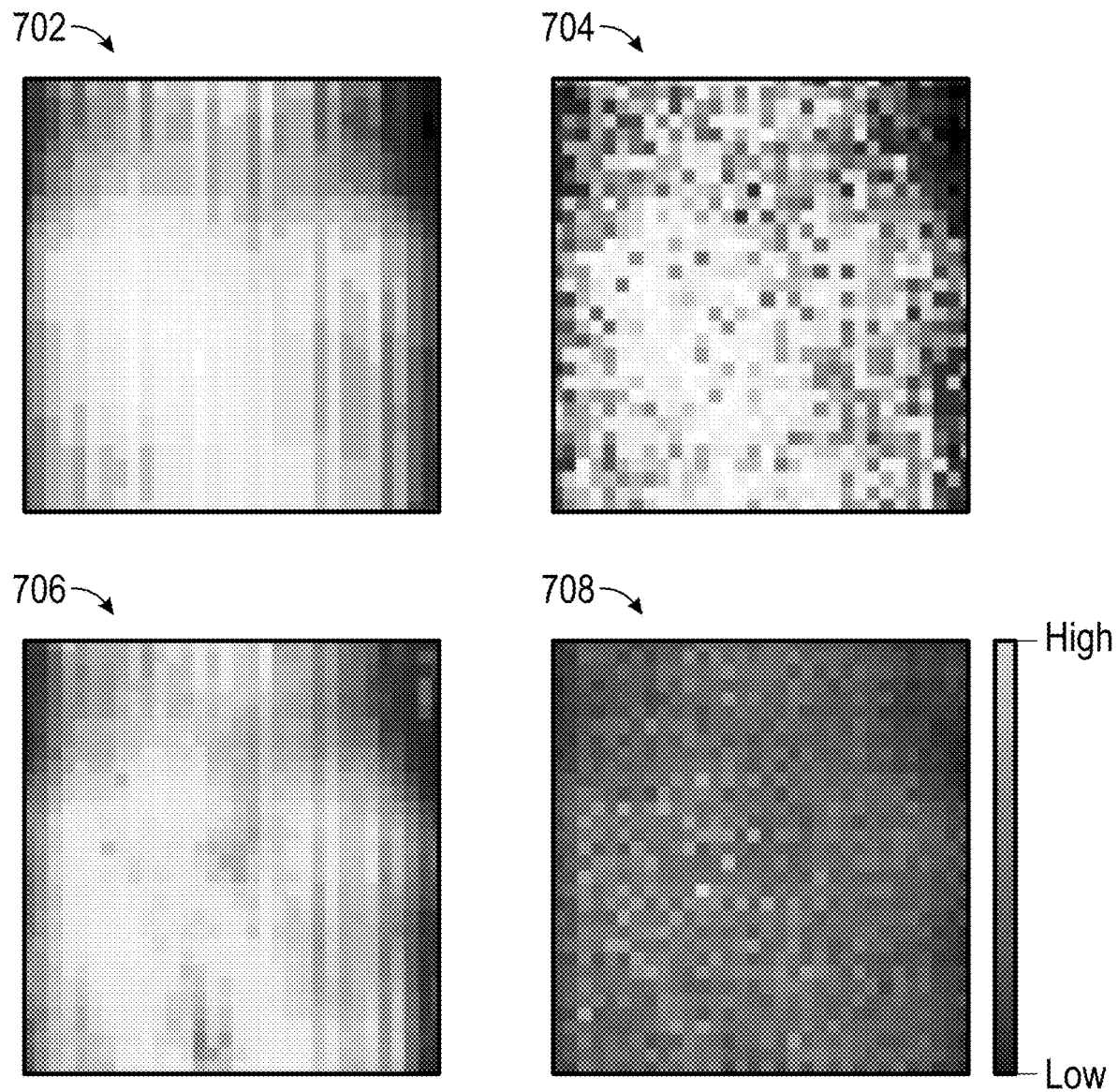
FIG. 7 shows wellbore images in accordance with one or more embodiments.
Figure 8:
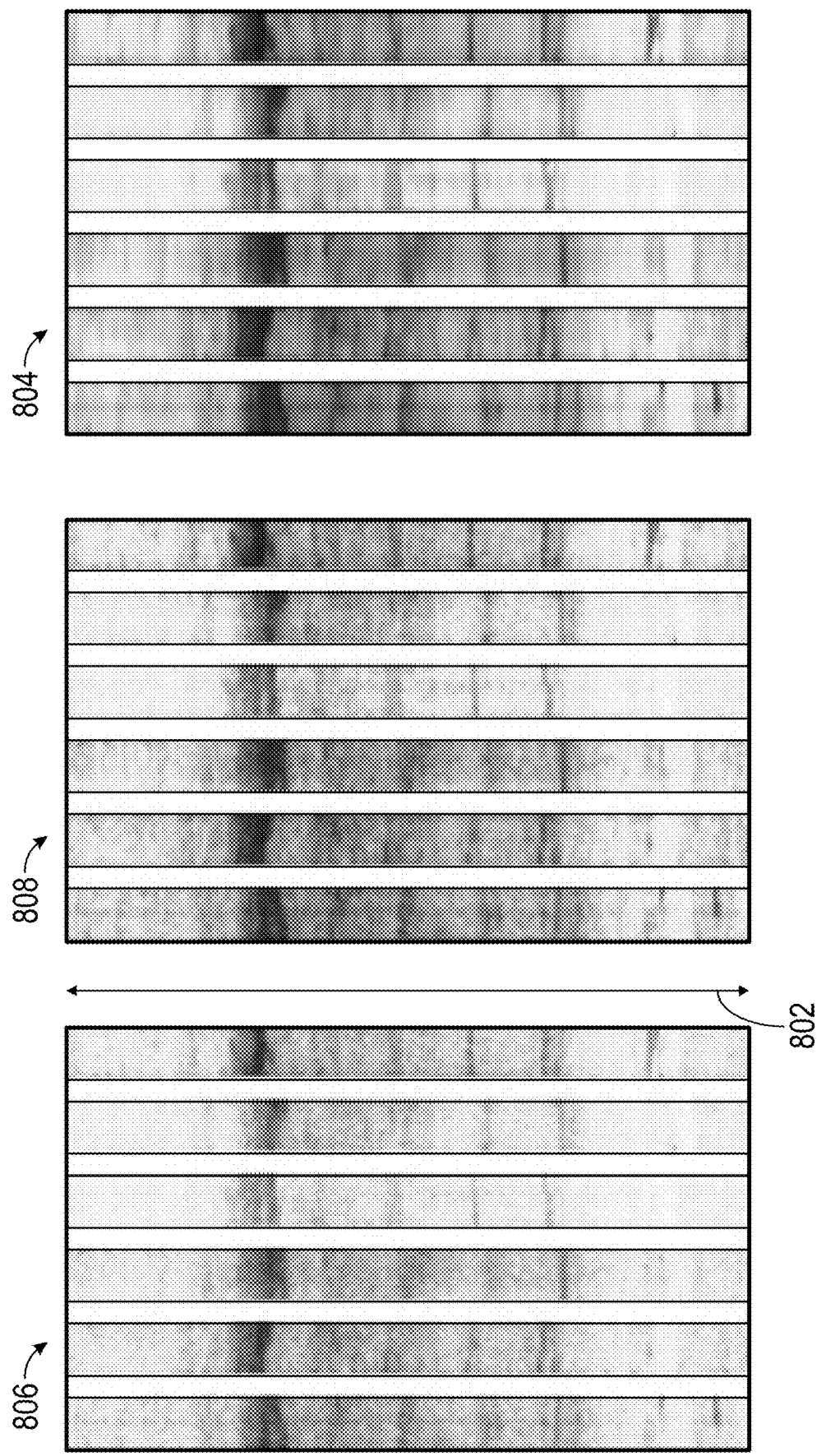
FIG. 8 shows wellbore images in accordance with one or more embodiments.

FIGS. 7 and 8 show the results of applying the workflow shown in flowchart (500). FIG. 7 shows a low-noise image (702) of the wellbore wall (108), such an image may be acquired by a wellbore imaging tool (102) traversing a portion of the wellbore (100) very slowly under ideal conditions. A suboptimal image (704) of the same portion of wellbore wall (108) may be generated by adding a numerically generated noise image to the low-noise image (702). The suboptimal image (704) may be regarded as an approximation to an image of the wellbore wall (108) collected by a wellbore imaging tool (102) traversing the portion of the wellbore at a rapid rate. The noise-attenuated image (706) of the wellbore wall (108) may be determined by applying the workflow depicted in flowchart (500) to the suboptimal image (704). It will be obvious to one of ordinary skill in the art that the noise-attenuated image (704) is a much better approximation to the low-noise image (702) than the suboptimal image (704). The uncertainty image (708) may also be determined by applying the workflow depicted in flowchart (500). The uncertainty image (708) indicates that every area of the noise-attenuated image (706) is known with broadly similar, low uncertainty.

FIG. 8 shows the application of the flowchart (500) applied to a wellbore image log extending 10 feet (3 m) in length along the wellbore axis (800) recorded by a six-sensor wellbore imaging tool (102). A low-noise wellbore image (804) is recorded by the wellbore imaging tool (102). A suboptimal wellbore image (806) is created from the low-noise wellbore image (804) by the addition of random noise to simulate a wellbore image that may be recorded in a noisy environment. Noise-attenuated wellbore image (808) may be generated by applying the trained CNN to the noisy suboptimal wellbore image (804). One of ordinary skill in the art will readily appreciate the improvement in the noise-attenuated wellbore image (808) over the noisy suboptimal wellbore image (806) and its great similarity to the original low-noise wellbore image (804).

A CNN may be implemented on dedicated, purpose-built application-specific integrated circuit, or using firmware configuration of one or more field-programmable gate arrays. CNNs may also be implemented in software on a computer system, such as the one depicted in FIG. 9.

Figure 9:
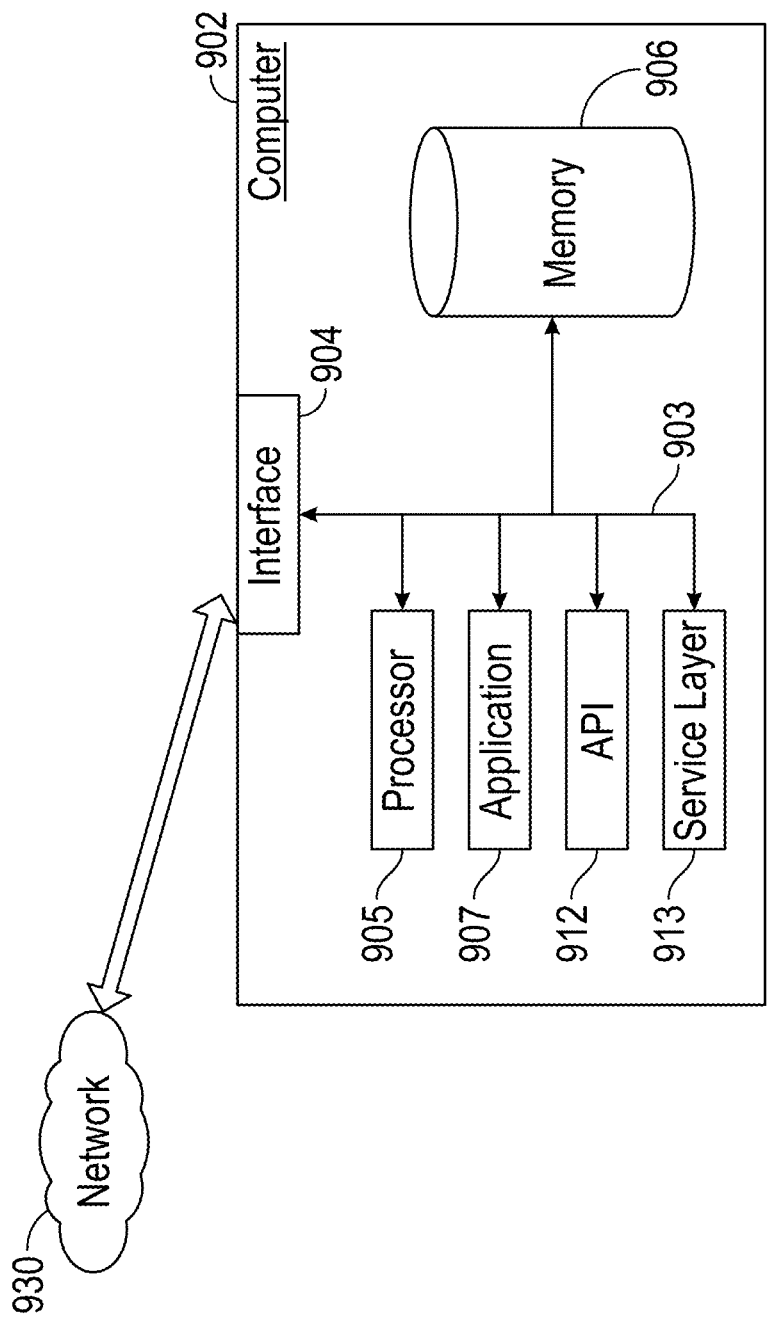
FIG. 9 shows a computer system in accordance with one or more embodiments.

FIG. 9 depicts a block diagram of a computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a Graphical User Interface (GUI).

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a noise-attenuated wellbore image, comprising:
    obtaining a plurality of training images of a first wellbore wall portion, wherein each training image comprises a first signal component and a first noise component;
    training, using a computer processor and the plurality of training images, an artificial neural network to estimate the first signal component of one of the plurality of training images;
    obtaining an application image of a second wellbore wall portion, wherein the application image comprises a second signal component and a second noise component; and
    determining, using the computer processor, the noise-attenuated wellbore image by applying the trained artificial neural network to the application image, wherein the noise-attenuated wellbore image comprises the second signal component.

2. The method of claim 1, wherein the artificial neural network comprises a convolutional neural network.

3. The method of claim 1, wherein training the artificial neural network comprises:
    predicting, using the artificial neural network, a predicted image from a first training image;
    defining a loss function based, at least in part, on the first training image and the predicted image; and
    finding an extremum of the loss function by modifying at least one parameter of the artificial neural network.

4. The method of claim 1, wherein training the artificial neural network comprises: storing a plurality of parameters of the trained artificial neural network in a non-transitory computer readable medium.

5. The method of claim 1, wherein obtaining the plurality of training images comprises:
causing a wellbore imaging tool to traverse an area in front of the first wellbore wall portion a plurality of times; and
recording, using the wellbore imaging tool, a wellbore image of the first wellbore wall portion during each traverse.

6. The method of claim 1, wherein obtaining the plurality of training images comprises:
determining a plurality of sub-images from a measured image of the first wellbore wall portion;
dividing the plurality of sub-images into a set of normal sub-images and a set of abnormal sub-images; and
selecting the plurality of training images from the set of normal sub-images.

7. The method of claim 1, wherein the first wellbore wall portion and the second wellbore wall portion are within the same wellbore.

8. The method of claim 1, wherein determining the noise-attenuated wellbore image further comprises:
selecting a plurality of image portions from the application image;
determining a noise-attenuated image portion from each of the plurality of image portions; and
synthesizing the noise-attenuated wellbore image by combining the noise-attenuated image portions.

9. The method of claim 1, wherein determining the noise-attenuated wellbore image further comprises:
perturbing at least one parameter of the artificial neural network;
determining a second noise-attenuated wellbore image by applying the perturbed artificial neural network to the application image; and
generating an uncertainty metric for a portion of the noise-attenuated wellbore image.

10. A non-transitory computer readable medium storing instructions executable by a computer processor, the instructions comprising functionality for:
receiving a plurality of training images of a first wellbore wall portion, wherein each training image comprises a first signal component and a first noise component;
training, using a computer processor and the plurality of training images, an artificial neural network to estimate the first signal component of one of the plurality of training images;
obtaining an application image of a second wellbore wall portion, wherein the application image comprises a second signal component and a second noise component; and
determining, using the computer processor, the noise-attenuated wellbore image by applying the trained artificial neural network to the application image, wherein the noise-attenuated wellbore image comprises the second signal component.

11. The non-transitory computer readable medium of claim 10, wherein the artificial neural network comprises a convolutional neural network.

12. The non-transitory computer readable medium of claim 10, wherein the instructions further comprise functionality for:
predicting, using the artificial neural network, a predicted image from a first training image;
defining a loss function based, at least in part, on the first training image and the predicted image; and
finding an extremum of the loss function by modifying at least one parameter of the artificial neural network.

13. The non-transitory computer readable medium of claim 10, wherein the instructions further comprise functionality for:
storing a plurality of parameters of the trained artificial neural network in a non-transitory computer readable medium.

14. The non-transitory computer readable medium of claim 10, wherein the instructions further comprise functionality for determining the plurality of training images based, at least in part, on a measured image of the first wellbore wall portion and a plurality of synthetic noise images.

15. The non-transitory computer readable medium of claim 14, wherein the instructions further comprise functionality for:
determining a plurality of sub-images from the measured image of the first wellbore wall portion;
dividing the plurality of sub-images into a set of normal sub-images and a set of abnormal sub-images; and
selecting the plurality of training images from the set of normal sub-images.

16. The non-transitory computer readable medium of claim 10, wherein the first wellbore wall portion and the second wellbore wall portion are within the same wellbore.

17. The non-transitory computer readable medium of claim 10, wherein the instructions further comprise functionality for:
selecting a plurality of image portions from the application image;
determining a noise-attenuated image portion from each of the plurality of image portions; and
synthesizing the noise-attenuated wellbore image by combining the noise-attenuated image portions.

18. The non-transitory computer readable medium of claim 10, wherein the instructions further comprise functionality for:
perturbing at least one parameter of the artificial neural network;
determining a second noise-attenuated wellbore image by applying the perturbed artificial neural network to the application image; and
generating an uncertainty metric for a portion of the noise-attenuated wellbore image.

19. A system comprising:
a wellbore imaging tool;
a conveyance device configured to convey the wellbore imaging tool within a wellbore; and
an image processor configured to:
receive a plurality of training images of a first wellbore wall portion, wherein each training image comprises a first signal component and a first noise component;
train, using a computer processor and the plurality of training images, an artificial neural network to estimate the first signal component of one of the plurality of training images;
obtain, using the wellbore imaging tool, an application image of a second wellbore wall portion, wherein the application image comprises a second signal component and a second noise component; and
determine, using the computer processor, a noise-attenuated wellbore image by applying the trained artificial neural network to the application image, wherein the noise-attenuated wellbore image comprises the second signal component.

20. The system of claim 19, wherein obtaining the plurality of training images comprises:
- causing the wellbore imaging tool to traverse an area in front of the first wellbore wall portion a plurality of times; and
- recording, using the wellbore imaging tool, a wellbore image of the first portion of the wellbore wall during each traverse.

* * * * *